(12) United States Patent
Meunier et al.

(10) Patent No.: US 6,389,389 B1
(45) Date of Patent: May 14, 2002

(54) SPEECH RECOGNITION USING UNEQUALLY-WEIGHTED SUBVECTOR ERROR MEASURES FOR DETERMINING A CODEBOOK VECTOR INDEX TO REPRESENT PLURAL SPEECH PARAMETERS

(75) Inventors: Jeffrey A. Meunier, Chicago; William M. Kushner, Arlington Heights, both of IL (US); David John Pearce, Basingstoke (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/417,371

(22) Filed: Oct. 13, 1999

Related U.S. Application Data
(60) Provisional application No. 60/104,047, filed on Oct. 13, 1998.

(51) Int. Cl.[7] .............................................. G10L 15/08
(52) U.S. Cl. ...................................... 704/222; 704/251
(58) Field of Search ................................ 704/221, 222, 704/251

(56) References Cited

U.S. PATENT DOCUMENTS

| | | |
|---|---|---|
| 5,544,277 A | 8/1996 | Bakis et al. |
| 5,751,903 A | 5/1998 | Swaminathan et al. |
| 5,797,119 A | 8/1998 | Ozawa |
| 5,926,785 A | 7/1999 | Akamine et al. |
| 5,956,683 A | 9/1999 | Jacobs et al. |
| 6,067,515 A * | 5/2000 | Cong et al. .................. 704/243 |
| 6,070,136 A * | 5/2000 | Cong et al. .................. 704/222 |
| 6,131,084 A * | 10/2000 | Hardwick .................... 704/230 |
| 6,161,089 A * | 12/2000 | Hardwick .................... 704/230 |
| 6,199,037 B1 * | 3/2001 | Hardwick .................... 704/208 |
| 6,219,642 B1 * | 4/2001 | Asghar et al. ............... 704/256 |

OTHER PUBLICATIONS

Law et al., "A Novel Split Residual Vector Quanitzation Scheme For Low Bit Rate Speech Coding". IEEE, 1994, pp. 493–496.

* cited by examiner

*Primary Examiner*—Tālivaldis Ivars Šmits
(74) *Attorney, Agent, or Firm*—Daniel K. Nichols

(57) ABSTRACT

Quantization unit (108) comprises evaluator (120) and comparator (122) in signal processing for identifying an utterance in system (100). The evaluator (120) weights a first intermediate result of an operation on a first set of a plurality of speech parameters (104) differently than a second intermediate result of an operation on a second set of the plurality of speech parameters (104) in a weighted representation of the plurality of speech parameters (104). The comparator (122) employs the weighted representation of the plurality of speech parameters (104) to determine a vector index to represent the plurality of speech parameters (104). The quantization unit (108), in one example, can employ split vector quantization in conjunction with the weighted representation to determine a vector index to represent the plurality of speech parameters (104).

50 Claims, 3 Drawing Sheets

SPEECH RECOGNITION USING UNEQUALLY-WEIGHTED SUBVECTOR ERROR MEASURES FOR DETERMINING A CODEBOOK VECTOR INDEX TO REPRESENT PLURAL SPEECH PARAMETERS

CROSS-REFERENCE TO RELATED APPLICATION

This application claims the priority of the following provisional patent application, which is assigned to the same assignee as this application. The below-listed application is hereby incorporated herein by reference in its entirety:

"METHOD OF VECTOR QUANTIZATION IN A SPEECH RECOGNITION SYSTEM," by Meunier et al., Ser. No. 60/104,047, filed Oct. 13, 1998.

FIELD OF THE INVENTION

The present invention relates generally to speech recognition systems and, in particular, to vector representation of speech parameters in signal processing for speech recognition.

BACKGROUND OF THE INVENTION

As a user talks in a speech recognition system, his speech waveform is captured and analyzed. During what is commonly referred to as "front-end" processing, acoustic features of the speech signal are extracted using a variety of signal processing techniques. These features provide a representation of the speech in a more compact format. Such features include (but are not limited to) filterbank channel outputs, linear predictive coding (LPC) coefficients, real cepstrum coefficients, and a variety of pitch and energy measures. These features can be transmitted or passed to a pattern recognition or matching system, commonly called the "back-end," that compares the incoming acoustic features to speech templates and attempts to postulate what acoustic events (words, phones, etc.) have been spoken.

To save memory or communication channel bandwidth in the "front-end," the acoustic features may also undergo a quantization step. As will be understood by those skilled in the art, the features represent a time slice of the speech waveform. During vector quantization, a single table or multiple tables of representative feature vectors are searched for the closest match to the current feature vector. When the closest match is found according to a defined distortion measure, the index of the closest match in the table is employed to represent the feature. Certain designs that employ a combination of speech features perform this lookup individually on each speech feature. Various other designs combine the parameters for all the features into one large vector and perform the lookup only once.

Prior art methods have been proposed for quantizing front-end parameters in speech recognition. As mentioned above, a set of features such as the cepstrum or the LPC coefficients, are typically quantized as a set in a single vector. If multiple types of features are present each type of feature is vector quantized as a separate set. When a scalar parameter is used, such as frame energy, the value is quantized with a scalar quantizer. In addition, multiple scalar values are quantized with multiple scalar quantizers.

Such previous techniques have shortcomings. For example, in cases where coefficients are correlated, previous implementations are wasteful of memory needed to store the quantization tables, wasteful of computations to perform the table lookups, and wasteful of memory/bandwidth necessary for storage/transmission of the codebook indices. As another example, one element in a vector previously could dominate a distortion measure used during quantization, due to differences in magnitude or statistical variance.

DETAILED DESCRIPTION OF THE PREFERRED EMBODIMENTS

Figure 1:
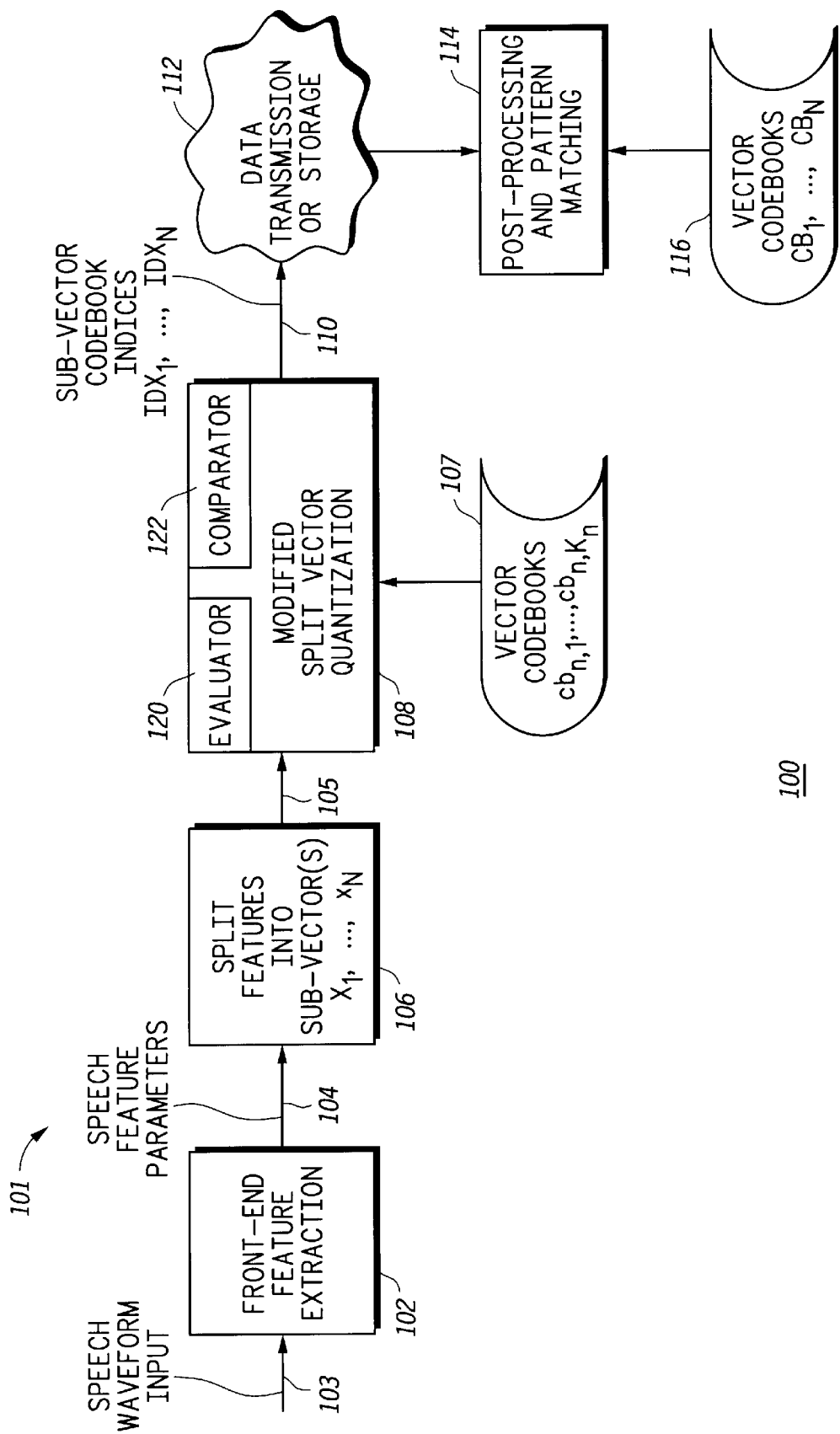
FIG. 1 is a block diagram of a system for processing an input speech waveform for speech recognition in accordance with the invention.

The invention encompasses a method of determining a vector index to represent a plurality of speech parameters in signal processing for identifying an utterance. A first intermediate result of an operation on a first set of the plurality of speech parameters is weighted differently than a second intermediate result of an operation on a second set of the plurality of speech parameters in a weighted representation of the plurality of speech parameters. The weighted representation of the plurality of speech parameters is employed to determine the vector index.

Another embodiment of the invention encompasses a system used in determining a vector index to represent a plurality of speech parameters in signal processing for identifying an utterance. An evaluator weights a first intermediate result of an operation on a first set of the plurality of speech parameters differently than a second intermediate result of an operation on a second set of the plurality of speech parameters in a weighted representation of the plurality of speech parameters. A comparator employs the weighted representation of the plurality of speech parameters to determine the vector index.

In one embodiment of the invention, a number of types of scalar features are grouped together for joint vector quantization. In another embodiment of the invention, scalar features are combined with vector features for joint quantization of a larger vector.

Vector quantization for speech recognition is described herein. In one example, multiple types of speech recognition front-end parameters are grouped together for vector quantization. For instance, a combination of scalar speech features (such as log frame energy) and vector speech features (such as the real cepstrum) are generated by the front end of a speech recognition system. To efficiently quantize such features, the features are grouped together in a vector or set of vectors, and vector quantized. A further embodiment of the invention quantizes together the log frame energy and the energy term from the real cepstrum (commonly referred to as $C_0$). In another example, these terms are advantageously combined with other cepstral coefficients for advantageous grouping together of dissimilar features, as described herein.

To prevent one vector element from dominating the standard Euclidean distortion:

$$d(x,cb)=(x-cb)'(x-cb)$$

where x is the composite feature vector and cb is the codebook vector under consideration, a selected distortion measure can be used. One distortion measure, known as the Mahalanobis distortion, is defined as:

$$d_{Mahalanobis}(x,cb) = (x-cb)'W^{-1}(x-cb)$$

where the weight matrix W is defined to be the covariance matrix of the input vector x. If the elements of the vector x are assumed to be independent, or the cross-correlation of the terms is discarded, the weighted distortion measure (weighted distortion metric) becomes:

$$d_{VarWg}(x,cb) = (x-cb)'\tilde{W}^{-1}(x-cb)$$

where the weight matrix $\tilde{W}$ is the diagonal variance matrix of the input vector x. Those skilled in the art will appreciate that employment of such weight matrices in a distortion measure has the effect of weighting the intermediate result of the calculation for a set of one or more vector elements differently from the intermediate result of the calculation for another set of one or more vector elements. Employment of these distortion measures advantageously improves the achievable recognition rate on quantized speech information, in one embodiment of the invention.

Turning to FIG. 1 system 100 is represented by a functional block diagram 101 that shows the processing steps performed for speech recognition in one embodiment of the invention. Such steps could be implemented in, for example, a digital signal processor, general purpose central processing unit or embedded microprocessor, custom integrated circuit, or other suitable circuit (not shown), as will be understood by those skilled in the art.

An extractor such as a front-end feature extraction unit 102 generally receives a speech waveform, data, or utterance as input 103. The feature extraction unit 102 calculates parameters 104 from the speech waveform of input 103. Parameters 104 characterize a portion of the speech waveform of input 103. For example, parameters 104 can comprise any of a multitude of spectrally-derived features or energy-based measures, as will be appreciated by those skilled in the art.

For example, the set of features of parameters 104 are split into N sub-vectors $\{x_1, \ldots, x_N\}$ in a splitter unit represented by block 106. In one example, this splitting operation (the organization of features of parameters 104 as elements into N vectors each having possibly unique length $l_n$) depends on the parameters 104 being used, and the techniques employed in quantization unit 108. Block 106 passes a signal 105 comprising each sub-vector $x_n$ to quantization unit 108.

For instance, quantization unit 108 comprises evaluator 120 and comparator 122. Evaluator 120 weights a first intermediate result of an operation on a first set of the plurality of speech parameters 104 within each sub-vector $x_n$ of signal 105 differently than a second intermediate result of an operation on a second set of the plurality of speech parameters 104 within each sub-vector $x_n$ of signal 105 in a weighted representation of the plurality of speech parameters 104. Comparator 122 employs the weighted representation of the plurality of speech parameters 104 to determine the vector index that represents the signal 105, as described herein.

In quantization unit 108, each sub-vector $x_n$ is checked against a corresponding codebook 107. Each of codebooks 107 consists of a table of representative vectors $\{cb_{n,1}, \ldots, cb_{n,K_n}\}$ for the nth sub-vector $x_n$. According to a prescribed search procedure (flowcharted in FIG. 2), the closest codebook vector $cb_{n,k}$ of the codebook 107 corresponding to the sub-vector $x_n$ is chosen. The index $idx_n$ of this closest codevector $cb_{n,k}$ is used to represent that sub-vector $x_n$. This index $idx_n$ is output in signal 110 from quantization unit 108 to intermediate unit 112. This process of splitting of parameters 104 into signal 105 comprising sub-vectors, and the subsequent quantization of each sub-vector $x_n$ using a codebook $cb_n$, can be referred to as "split vector quantization," as will be understood by those skilled in the art.

The chosen index $idx_n$ for each sub-vector $x_n$ is transmitted by or stored in intermediate unit 112, depending on the speech recognition application being implemented. Advantageously, a significant degree of data compression can be achieved through employment of the techniques described herein, reducing the bandwidth required for a transmission channel or reducing the memory needed for storage.

In one example, post-processing and pattern recognition unit 114 employs indices $idx_n$ of signal 110 received by intermediate unit 112 along with set of codebooks 116, to make estimations, determinations, approximations, or hypotheses regarding the content of the speech utterance of input 103. For instance, codebooks 116 typically comprise a copy of codebooks 107, as will be understood by those skilled in the art.

Figure 2:
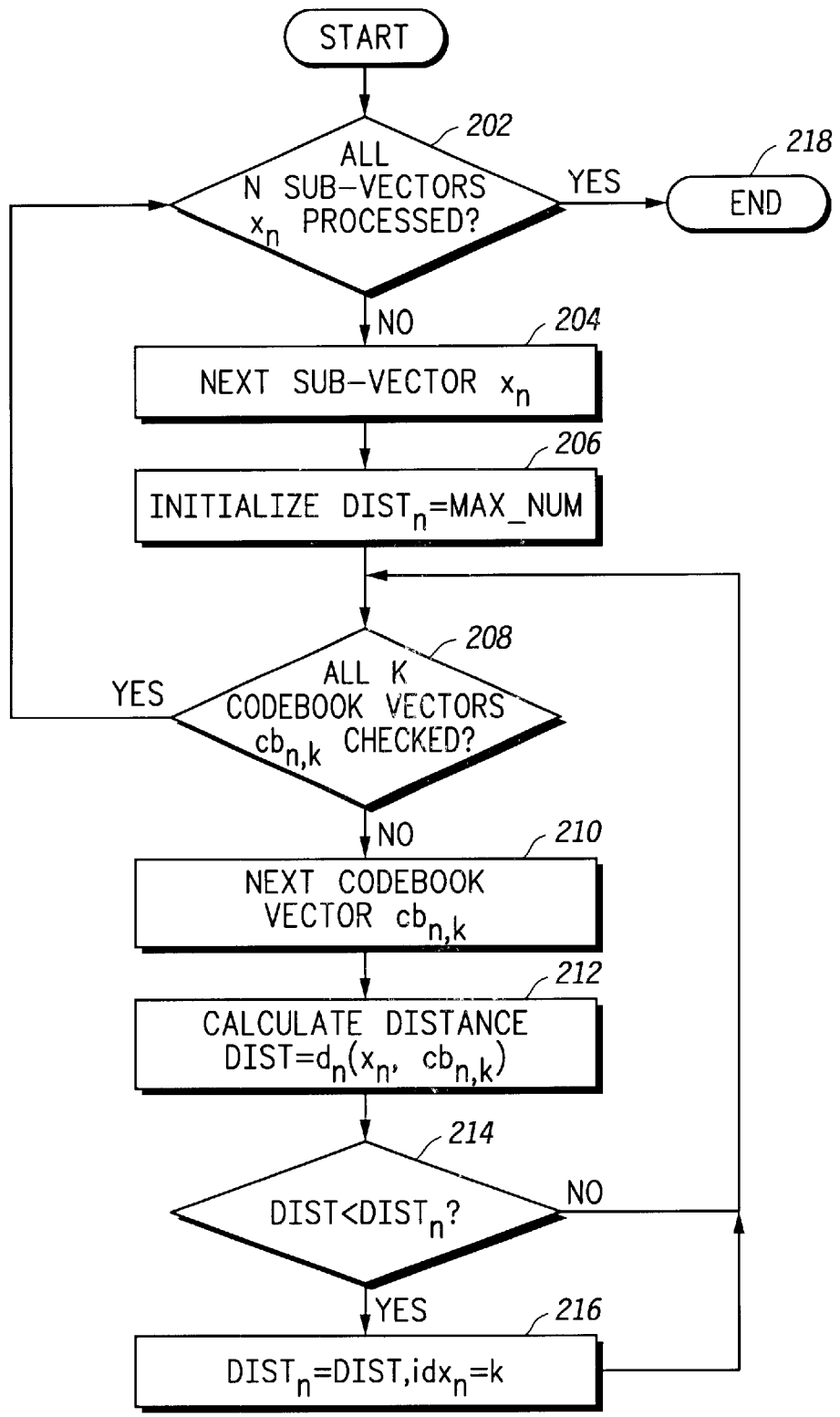
FIG. 2 is a flowchart outlining steps for vector quantization in the system of FIG. 1 in accordance with one embodiment of the invention.

Turning to FIG. 2, flow chart 201 shows an exemplary scheme for quantization of sub-vectors $x_n$ of signal 105 in quantization unit 108. Each sub-vector $x_n$ is taken in turn until check step 202 indicates that all sub-vectors $x_n$ have been processed. If one or more sub-vectors $x_n$ still remain, the next sub-vector $x_n$ is considered in step 204. The minimum distortion $dist_n$ to a codebook vector $cb_{n,k}$ is initialized to a large value MAX_NUM in step 206. Step 208 controls the codebook search, checking whether all codebook entries $\{cb_{n,1}, \ldots, cb_{n,K_n}\}$ have been tried. If not, the next codevector $cb_{n,k}$ is selected at step 210. The core of the codebook search is performed in steps 212–216.

At step 212, a measurement of the distortion between the sub-vector $x_n$ and the current codevector $cb_{n,k}$ is made. In one example, this distortion dist is computed by employing a distortion calculation $d_n(\ )$ which is dependent on sub-vector $x_n$. For instance, the distortion measure used depends on sub-vector $x_n$ and is not necessarily constant, to allow employment of different distortion measures (possibly different in both type and weight parameters) for different sub-vectors $x_n$. This advantageously allows quantization by quantization unit 108 of sub-vectors $x_n$ of signal 105 to be optimized according to features of the sub-vector $x_n$. A number of embodiments exist, for instance, based on different distortion measures which employ the following core calculation (as a weighted distortion metric):

$$d_n(x_n, cb_{n,k}) = (x_n - cb_{n,k})'W_n^{-1}(x_n - cb_{n,k}),$$

with different weight matrices $W_n^{-1}$. An unweighted Euclidean is calculated by employing the matrix:

$$W_n^{-1} = \begin{bmatrix} 1 & 0 & 0 \\ 0 & \ddots & 0 \\ 0 & 0 & 1 \end{bmatrix}$$

A variance weighted Euclidean is calculated when the diagonal inverse variance matrix:

$$W_n^{-1} = \begin{bmatrix} \frac{1}{\sigma_{x_n(1)}^2} & 0 & 0 \\ 0 & \ddots & 0 \\ 0 & 0 & \frac{1}{\sigma_{x_n(l_n)}^2} \end{bmatrix}$$

is employed, where the inverse component variances of the sub-vector $x_n$ are on the diagonal. The more general covariance weighted Euclidean, also known as the Mahalanobis distortion, is calculated when the matrix:

$$W_n^{-1} = (COV(x_n))^{-1}$$

is employed, where the operation $COV(x)$ denotes the covariance matrix for a vector x. In another example, an arbitrary distortion measure can be defined by employing an empirically derived weight matrix:

$$W_n^{-1} = \begin{bmatrix} w_n^{1,1} & \cdots & w_n^{1,l_n} \\ \vdots & \ddots & \vdots \\ w_n^{l_n,1} & \cdots & w_n^{l_n,l_n} \end{bmatrix}$$

where the coefficients are chosen according to a set of external criteria or objectives.

Through employment of these distortion measures, various different quantization schemes are possible in quantization unit 108 for quantizing sub-vectors $x_n$ of signal 105. One embodiment employs an unweighted Euclidean distortion for the quantization in quantization unit 108 of vector (e.g., spectral) speech parameters of sub-vectors $x_n$ of signal 105, and a variance weighted Euclidean for quantization in quantization 108 of scalar (e.g., energy-based) speech parameters of sub-vectors $x_n$ of signal 105. A second embodiment employs an unweighted Euclidean distortion for the quantization of spectral parameters of sub-vectors $x_n$ of signal 105, and a full covariance weighted Euclidean for the set of energy-based parameters of sub-vectors $x_n$ of signal 105. A third embodiment employs one of the weighted distortion measures to combine dissimilar parameters, such as subsets of the spectral parameters of sub-vectors $x_n$ of signal 105 and the energy-based parameters of sub-vectors $x_n$ of signal 105, for quantization in the same sub-vector $x_n$. In each of these embodiments, performance gain is achieved by employing a distortion measure which more accurately represents the "cost" associated with substitution of a given input sub-vector $x_n$ with a codevector $cb_{n,k}$ for recognition subsequently performed by post-processing and pattern recognition unit 114 (FIG. 1).

Step 214, in quantization unit 108, performs a check to see if the measured distortion dist is less than the smallest distortion $dist_n$ observed so far. If it is, then the current codevector $cb_{n,k}$ is the closest codevector $cb_{n,k}$ to the current sub-vector $x_n$ that has been found so far. Step 216 updates the smallest observed distortion dist, and stores the index k of the codevector $cb_{n,k}$ in $idx_n$. The loop continues for all codebook vectors $cb_{n,k}$ and all sub-vectors $x_n$, until all sub-vectors $x_n$ have been processed. In step 218, at the conclusion of the exemplary search in flow chart 201, a set of indices $\{idx_1, \ldots, idx_N\}$ representing the features of parameters of sub-vectors $x_n$ of signal 105 are available and output in signal 110 (FIG. 1).

In determining the weight matrices $\{W_1, \ldots, W_N\}$ of quantization unit 108 for the variance and covariance weighted distortion measures described herein, a number of embodiments exist. In one embodiment, the variance or covariance statistics in $W_n$ are measured from the speech parameters (not shown) employed in training the codebook vectors $cb_n$ of codebooks 107 for quantization unit 108. In a second embodiment, the statistics are calculated from the speech parameters (not shown) employed in training the speech templates (not shown) employed in back-end pattern recognition performed by unit 114. In a third embodiment, statistics are calculated by employing speech data (not shown) that is not otherwise used for training in the system 100. In a fourth embodiment, the statistics or weighting coefficients in $W_n$ can be estimated and adjusted empirically, without employing actual or real speech parameters, as will be appreciated by those skilled in the art.

Since the distortion calculation employed during the vector quantization ("VQ") search comprises the majority of the computation, a number of embodiments exist for reducing the computational load of the task. One embodiment, applicable to any of the distortion calculations outlined herein, provides an advantageously simplified modification of a weight matrix by a scalar value:

$$\hat{W}_n^{-1} = \frac{1}{w_n^{?,?}} W_n^{-1} = \frac{1}{w_n^{?,?}} \begin{bmatrix} w_n^{1,1} & \cdots & w_n^{1,l_n} \\ \vdots & \ddots & \vdots \\ w_n^{l_n,1} & \cdots & w_n^{l_n,l_n} \end{bmatrix}$$

where the value $w_n^{2,2}$ is equal to one of the values in the original matrix $W_n^{-1}$. This results in a modified weight matrix $\hat{W}_n^{-1}$ that contains one or more elements equal to one, thereby requiring desirably fewer multiplications during the computation of distortion.

Another embodiment is applicable in cases where the sub-vector length $l_n$ is equal to two and the weight matrix is symmetric. That is to say:

$$W_n^{-1} = \begin{bmatrix} w_n^{1,1} & w_n^{1,2} \\ w_n^{2,1} & w_n^{2,2} \end{bmatrix}, w_n^{1,2} = w_n^{2,1}$$

In this case, the distortion calculation can be alternately computed as:

$$d_n(x_n, cb_{n,k}) = \left(\sqrt{w_n^{1,1}} x_n(1) - \sqrt{w_n^{1,1}} cb_{n,k}(1)\right)^2 +$$
$$C_n\left(\sqrt{w_n^{1,1}} x_n(1) - \sqrt{w_n^{1,1}} cb_{n,k}(1)\right)\left(\sqrt{w_n^{2,2}} x_n(2) - \sqrt{w_n^{2,2}} cb_{n,k}(2)\right) + \left(\sqrt{w_n^{2,2}} x_n(2) - \sqrt{w_n^{2,2}} cb_{n,k}(2)\right)^2$$
$$= (x_n'(1) - cb_{n,k}'(1))^2 + C_n(x_n'(1) - cb_{n,k}'(1))(x_n'(2) - cb_{n,k}'(2)) + (x_n'(2) - cb_{n,k}'(2))^2.$$

where x(i) denotes the ith element of the sub-vector $x_n$, and:

$$C_n = \frac{2w_n^{1,2}}{\sqrt{w_n^{1,1} w_n^{2,2}}},$$

$$x_n'(i) = \sqrt{w_n^{i,i}} x_n(i),$$

$$cb_{n,k}'(i) = \sqrt{w_n^{i,i}} cb_{n,k}(i).$$

By pre-multiplying the codebook vectors $cb_{n,k}$ with the square root factors, and by storing the values of $C_n$, the distortions can be efficiently calculated. The sub-vector $x_n$ is scaled with the square root factors once, and the advantageously simplified calculation is performed.

Another embodiment is applicable when the off-diagonal coefficients satisfy the following condition: $w_n^{1,2}=w_n^{2,1}=0$. In this case, further manipulation can show the distortion calculation to be:

$$d_n(x_n,cb_{n,k})=(w_n^{1,1}(x_n(1))^2+w_n^{2,2}(x_n(2))^2)+$$

$$(w_n^{1,1}(cb_{n,k}(1))^2+w_n^{2,2}(cb_{n,k}(2))^2)+x_n(1)(-2w_n^{1,1}cb_{n,k}(1))+x_n(2)(-2w_n^{2,2}cb_{n,k}(2))$$

Now, the first term in the calculation of each distortion $d_n$ above remains constant for each codebook vector $\{cb_{n,1}, cb_{n,2}, \ldots, cb_{n,K_n}\}$. Since the distortions are only compared against one another, the constant first term can be advantageously dropped from the calculation. The second term in the above distortion calculation comprises a "codebook vector energy" that is pre-stored. The final or remaining terms in the above distortion calculation can be simplified by pre-scaling of the codebook vectors $cb_{n,k}$. In this embodiment, the modified distortion $d_n'$, which is proportional to the original distortion $d_n'$ for sub-vector $x_n$, becomes:

$$d_n'(x_n,cb_{n,k})=C_{n,k}+x_n(1)\cdot cb_{n,k}'(1)+x_n(2)\cdot cb_{n,k}'(2),$$

$$C_{n,k}=(w_n^{1,1}(cb_{n,k}(1))^2+w_n^{2,2}(cb_{n,k}(2))^2),$$

$$cb_{n,k}'(i)=-2w_n^{1,1}cb_{n,k}(i).$$

Figure 3:
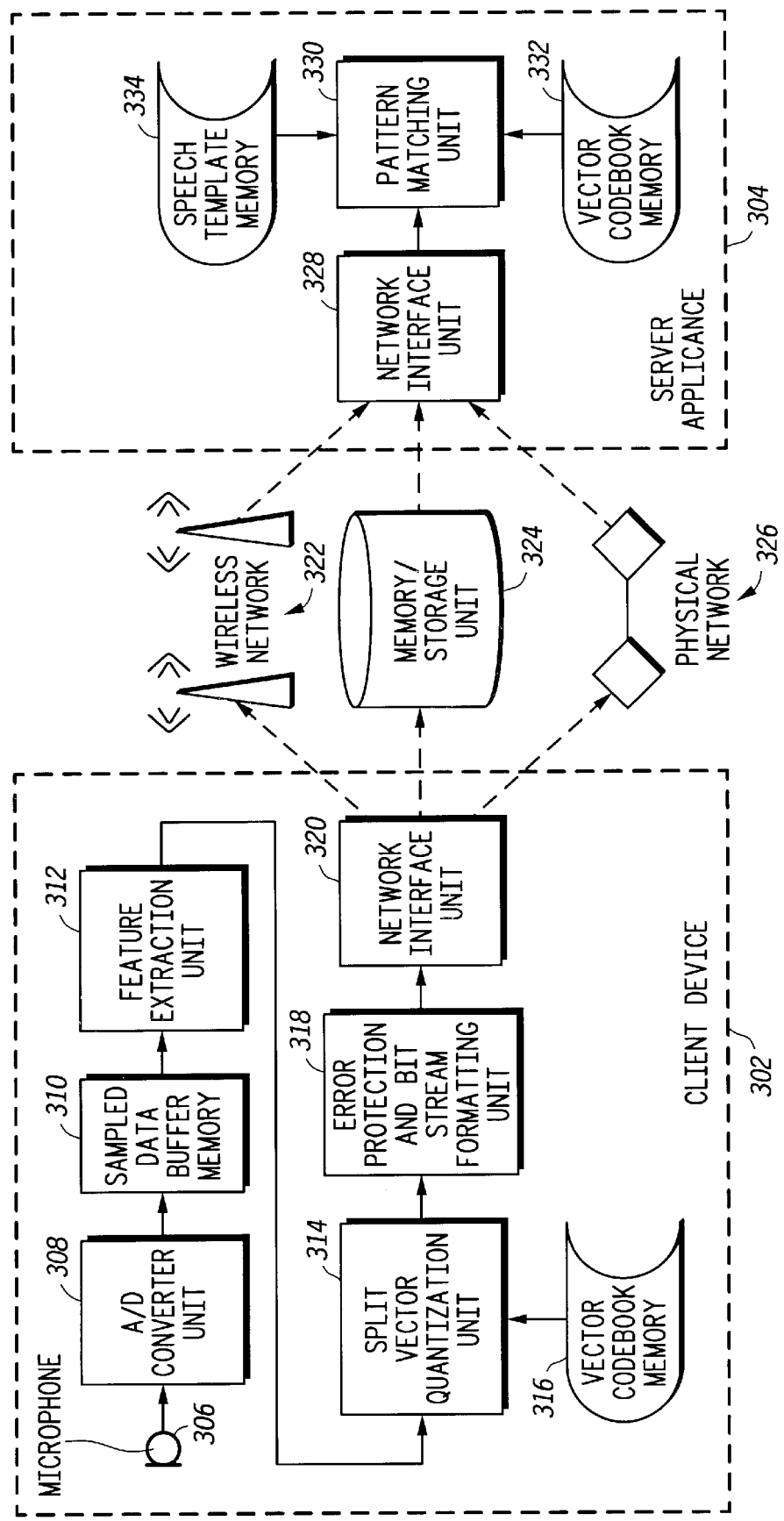
FIG. 3 is a block diagram showing an embodiment of the invention in a distributed speech recognition system.

Turning to FIG. 3, one example of system 100 comprises a distributed speech recognition system. The processing necessary for recognition of a speech utterance is divided between client device 302 and server appliance 304, in one embodiment.

Client device 302, in one example, is physically located with a user (not shown) of system 100. Client device 302 can comprise any of many possible portable or non-portable electronic devices, such as a cellular radiotelephone, mobile dispatch radio, digital personal assistant, mobile data terminal, personal computer, information kiosk, radio dispatch console, or any other suitable device (not shown), as will be understood by those skilled in the art.

Server appliance 304, in one example, is a computational resource located remotely from client device 302. Such server appliances 304 could comprise but are not limited to, network switching infrastructure, general purpose server computers, personal computers, specialized processing hardware, or any other suitable resource (not shown), as will be understood by those skilled in the art.

Client device 302 and server appliance 304 are connected via a communication link 322, 326 or storage device 324. One or more instances of storage device 324 could include computer hard drives, physical RAM memory, or any other suitable read/write storage mechanisms. One or more instances of communication link 322, 326 could comprise but are not limited to, one or more wireless networks 322, wired physical networks 326 such as ethernet or TCP/IP connections, or any other suitable data transmission protocol.

At client device 302, microphone 306 generally receives an acoustic speech wave and converts it to an analog electric signal. The A/D converter unit 308 samples this analog waveform and represents it with a digital bitstream. These digital samples then undergo digital processing by client device 302.

Units 310–320 involve general purpose processing tasks that could be performed by a digital signal processor, general purpose central processing unit or embedded microprocessor, custom integrated circuit, or other suitable circuitry. The sample data is first buffered in unit 310 in a small data buffer memory. The feature extraction unit 312 converts the buffered samples into an alternative representation of speech consisting of feature parameters. The vector quantization unit 314 employs the modified split vector quantization technique described herein, to compute codebook indices from the speech features. For instance, quantization unit 314 can employ codebook 316. At block 318, the codebook indices are formatted for transfer to server appliance 304, and optionally are error-protected with any one of a number of techniques. Network interface unit 320 then communicates this data over the network 322, 326 or to the storage device 324 being employed.

At server appliance 304, a similar network interface 328, in one example, receives this data from the network 322, 326 or the storage device 324. The data is then transferred to pattern matching unit 330. In pattern matching unit 330, the indices may, in one example, be converted back to speech features by employing codebook 332. Also, these indices may be compared against speech templates 334 to estimate, determine, approximate, or hypothesize what utterances have been said or input at microphone 306.

In summary, vector quantization for speech recognition is described herein. Through split-vector quantization and the employment of modified distortion measures for each subvector, the invention converts speech feature parameters to a set of vector quantizer table indices. Techniques for the calculation of parameters for the modified distortion measures are additionally described herein. The resultant output representation of indices provides a compact data stream for transmission or storage of speech parameters in a speech recognition system. In one embodiment of the invention, statistically dissimilar recognition parameters are efficiently quantized together, taking advantage of any correlation between such parameters. Techniques for computationally efficient calculation of the output indices are also described herein.

Although the invention has been described and illustrated in the above description and drawings, it is understood that this description is by way of example only and that numerous changes and modifications can be made by those skilled in the art without departing from the spirit and scope of the invention. Although the present invention finds particular application in portable cellular radiotelephones, the invention could be applied to any device employing speech recognition, including pagers, electronic organizers, computers, and telephony equipment. Applicants' invention should be limited only by the following claims.

What is claimed is:

1. A method of determining a vector index to represent a plurality of speech parameters in signal processing for identifying an utterance, the method comprising the steps of:

weighting a first intermediate result of an operation on a first set of the plurality of speech parameters differently than a second intermediate result of an operation on a second set of the plurality of speech parameters in a weighted representation of the plurality of speech parameters; and employing the weighted representation of the plurality of speech parameters to determine the vector index.

2. The method of claim 1 wherein the step of weighting the first intermediate result of the operation on the first set of the plurality of speech parameters differently than the second intermediate result of the operation on the second set of the plurality of speech parameters in the weighted representation comprises the step of selecting the first set of the plurality of speech parameters to comprise a first type of parameter different from a second type of parameter that comprises the second set of the plurality of speech parameters.

3. The method of claim 1 wherein the step of weighting the first intermediate result of the operation on the first set of the plurality of speech parameters differently than the second intermediate result of the operation on the second set of the plurality of speech parameters in the weighted representation comprises the steps of:
   selecting the first set of the plurality of speech parameters to comprise a vector speech parameter of the plurality of speech parameters, and
   selecting the second set of the plurality of speech parameters to comprise a scalar speech parameter of the plurality of speech parameters.

4. The method of claim 1 wherein the step of weighting the first intermediate result of the operation on the first set of the plurality of speech parameters differently than the second intermediate result of the operation on the second set of the plurality of speech parameters in the weighted representation comprises the steps of:
   selecting the weighted representation to comprise a weighted distortion measure, and
   weighting the first intermediate result of the operation on the first set of the plurality of speech parameters differently than the second intermediate result of the operation on the second set of the plurality of speech parameters in the weighted distortion measure.

5. The method of claim 4 wherein the step of employing the weighted representation to determine the vector index comprises the step of employing the weighted distortion measure to determine the vector index.

6. The method of claim 4 wherein the step of weighting the first intermediate result of the operation on the first set of the plurality of speech parameters differently than the second intermediate result of the operation on the second set of the plurality of speech parameters in the weighted representation comprises the step of selecting the weighted distortion measure to employ a covariance matrix, and wherein the step of employing the weighted representation to determine the vector index comprises the step of employing the covariance matrix in the weighted distortion measure to determine the vector index.

7. The method of claim 4 wherein the step of weighting the first intermediate result of the operation on the first set of the plurality of speech parameters differently than the second intermediate result of the operation on the second set of the plurality of speech parameters in the weighted representation comprises the step of selecting the weighted distortion measure to employ a diagonal inverse variance matrix, and wherein the step of employing the weighted representation to determine the vector index comprises the step of employing the diagonal inverse variance matrix in the weighted distortion measure to determine the vector index.

8. The method of claim 4 wherein the step of weighting the first intermediate result of the operation on the first set of the plurality of speech parameters differently than the second intermediate result of the operation on the second set of the plurality of speech parameters in the weighted representation comprises the step of selecting the weighted distortion measure to employ an empirically determined weight matrix, and wherein the step of employing the weighted representation to determine the vector index comprises the step of employing the empirically determined weight matrix in the weighted distortion measure to determine the vector index.

9. The metnod of 4 wherein the step of weighting the first intermediate result of the operation on the first set of the plurality of speech parameters differently than the second intermediate result of the operation on the second set of plurality of speech parameters in the weighted representation comprises the step of selecting the weighted distortion measure to employ a weight matrix scaled such that at least one matrix element is equal to one, and wherein the step of employing the weighted representation to determine the vector index comprises the step of employing the weight matrix in the weighted distortion measure to determine the vector index.

10. The method of 4 wherein the step of weighting the first intermediate result of the operation on the first set of the plurality of speech parameters differently than the second intermediate result of the operation on the second set of the plurality of speech parameters in the weighted representation comprises the step of selecting the weighted distortion measure to comprise a weight matrix that is symmetric, and wherein the step of employing the weighted representation to determine the vector index comprises the step of employing the weight matrix in the weighted distortion measure to determine vector index.

11. The method of claim 1 wherein the step of weighting the first intermediate result of the operation on the first set of the plurality of speech parameters differently than the second intermediate result of the operation on the second set of the plurality of speech parameters in the weighted representation comprises the step of selecting the first set of the plurality of speech parameters and the second set of the plurality of speech parameters to comprise scalar parameters of the plurality of speech parameters, and wherein the step of employing the weighted representation to determine the vector index comprises the step of determining the vector index to represent the scalar parameters.

12. The method of claim 11 wherein the step of selecting the first set of the plurality of speech parameters and the second set of the plurality of speech parameters to comprise the scalar parameters comprises the step of selecting the first set of the plurality of speech parameters and the second set of the plurality of speech parameters to comprise different representations of speech signal energy, and wherein the step of determining the vector index to represent the scalar parameters comprises the step of determining the vector index to represent the different representations of speech signal energy.

13. The method of claim 12 wherein the step of selecting the first set of the plurality of speech parameters and the second set of the plurality of speech parameters to comprise different representations of speech signal energy comprises the steps of:
   selecting the first set of the plurality of speech parameters to comprise log frame energy, and
   selecting the second set of the plurality of speech parameters to comprise real cepstrum energy,
   wherein the step of determining the vector index to represent the different representations of speech signal energy comprises the step of determining the vector index to represent the log frame energy and the real cepstrum energy.

14. The method of claim 1 wherein the step of weighting the first intermediate result of the operation on the first set of the plurality of speech parameters differently than the second intermediate result of the operation on the second set of the plurality of speech parameters in the weighted representation comprises the step of employing weight parameters to weight the first intermediate result and the second intermediate result to determine the weighted representation.

15. The method of claim 14 wherein the step of employing the weight parameters to determine the weighted representation comprises the step of deriving the weight parameters from at least one speech sample employed in a determination of a quantization table employed to determine the vector index.

16. The method of claim 14 wherein the step of employing the weight parameters to determine the weighted representation comprises the step of deriving the weight parameters from at least one speech sample that serves as a basis for pattern recognition of a signal based on the vector index.

17. The method of claim 14 wherein the step of employing the weight parameters to determine the weighted representation comprises the step of deriving the weight parameters from a first speech sample different from a second speech sample employed in a determination of a quantization table employed to determine the vector index and different from a third speech sample serving as a basis for pattern recognition of a signal based on the vector index.

18. The method of claim 14 wherein the step of employing the weight parameters to determine the weighted representation comprises the step of empirically determining the weight parameters.

19. The method of claim 1 wherein the vector index comprises a first vector index, wherein the plurality of speech parameters comprise a first plurality of speech parameters, wherein the weighted representation comprises a first weighted representation, in combination with a method of determining a second vector index to represent a second plurality of speech parameters in signal processing for identifying an utterance, further comprising the step of determining the first plurality of speech parameters and the second plurality of speech parameters based on a same speech input.

20. The method of claim 19 further comprising the steps of:
   weighting a first intermediate result of an operation on a first set of the second plurality of speech parameters differently than a second intermediate result of an operation on a second set of the second plurality of speech parameters in a second weighted representation of the second plurality of speech parameters, and
   employing the second weighted representation of the second plurality of speech parameters to determine the second vector index.

21. The method of claim 20 wherein the step of weighting the first intermediate result of the operation on the first set of the first plurality of speech parameters differently than the second intermediate result of the operation on the second set of the first plurality of speech parameters in the first weighted representation and the step of employing the first weighted representation to determine the first vector index comprises the step of employing a first distortion measure to determine the first vector index, and
   wherein the step of weighting the first intermediate result of the operation on the first set of the second plurality of speech parameters differently than the second intermediate result of the operation on the second set of the second plurality of speech parameters in the second weighted representation and the step of employing the second weighted representation to determine the second vector index comprise the step of employing a second distortion measure different from the first distortion measure to determine the second vector index.

22. The method of claim 20 in combination with a method of vector quantization further comprising the steps of:
   employing a codebook to quantize the first plurality of speech parameters to determine the first vector index, and
   employing a codebook to quantize the second plurality of speech parameters to determine the second vector index.

23. The method of claim 22 wherein the step of employing the codebook to quantize the first plurality of speech parameters to determine the first vector index comprises the step of employing a first codebook to quantize the first plurality of speech parameters to determine the first vector index, and wherein the step of employing the codebook to quantize the second plurality of speech parameters to determine the second vector index comprises the step of employing a second codebook different from the first codebook to quantize the second plurality of speech parameters to determine the second vector index.

24. The method of claim 22 wherein the step of employing the codebook to quantize the first plurality of speech parameters to determine the first vector index and the step of employing the codebook to quantize the second plurality of speech parameters to determine the second vector index comprise the step of employing split vector quantization to quantize the first plurality of speech parameters to determine the first vector index and quantize the second plurality of speech parameters to determine the second vector index.

25. The method of claim 1 wherein the step of weighting the first intermediate result of the operation on the first set of the plurality of speech parameters differently than the second intermediate result of the operation on the second set of the plurality of speech parameters in the weighted representation comprises the step of causing an increased effect of the first intermediate result in the weighted representation.

26. A system used in determining a vector index to represent a plurality of speech parameters in signal processing for identifying an utterance, the system comprising:
   an evaluator that weights a first intermediate result of an operation on a first set of the plurality of speech parameters differently than a second intermediate result of an operation on a second set of the plurality of speech parameters in a weighted representation of the plurality of speech parameters; and
   a comparator that employs the weighted representation of the plurality of speech parameters to determine the vector index.

27. The system of claim 26 wherein the first set of the plurality of speech parameters comprises a first type of parameter different from a second type of parameter that comprises the second set of the plurality of speech parameters.

28. The system of claim 26 wherein the first set of the plurality of speech parameters comprises a vector speech parameter of the plurality of speech parameters, and wherein the second set of the plurality of speech parameters comprises a scalar speech parameter of the plurality of speech parameters.

29. The system of claim 26 wherein the weighted representation comprises a weighted distortion measure.

30. The system of claim 29 wherein the evaluator weights the first intermediate result differently than the second intermediate result in the weighted distortion measure, and wherein the comparator employs the weighted distortion measure to determine the vector index.

31. The system of claim 29 wherein the weighted distortion measure employs a covariance matrix.

32. The system of claim 29 wherein the weighted distortion measure employs a diagonal inverse variance matrix.

33. The system of claim 29 wherein the weighted distortion measure employs an empirically determined weight matrix.

34. The system of claim 29 wherein the weighted distortion measure employs a weight matrix scaled such that at least one matrix element is equal to one.

35. The system of claim 29 wherein the weighted distortion measure comprises a weight matrix that is symmetric.

36. The system of claim 26 wherein the first set of the plurality of speech parameters and the second set of the plurality of speech parameters comprise scalar parameters of the plurality of speech parameters.

37. The system of claim 36 wherein the scalar parameters comprise different representations of speech signal energy.

38. The system of claim 37 wherein the first set of the plurality of speech parameters comprises log frame energy, and wherein the second set of the plurality of speech parameters comprises real cepstrum energy.

39. The system of claim 26 wherein the evaluator employs weight parameters to weight the first intermediate result and the second intermediate result to determine the weighted representation.

40. The system of claim 39 wherein the weight parameters are derived from at least one speech sample employed in a determination of a quantization table employed to determine the vector index.

41. The system of claim 39 wherein the weight parameters are derived from at least one speech sample that serves as a basis for pattern recognition of a signal based on the vector index.

42. The system of claim 39 wherein the weight parameters are derived from a first speech sample different from a second speech sample employed in a determination of a quantization table employed to determine the vector index and different from a third speech sample that serves as a basis for pattern recognition of a signal based on the vector index.

43. The system of claim 39 wherein the weight parameters comprise empirically derived weight parameters.

44. The system of claim 26 wherein the vector index comprises a first vector index, wherein the plurality of speech parameters comprise a first plurality of speech parameters, wherein the weighted representation comprises a first weighted representation, and further comprising an extractor that determines the first plurality of speech parameters and a second plurality of speech parameters based on a same speech input.

45. The system of claim 44 wherein the evaluator weights a first intermediate result of an operation on a first set of the second plurality of speech parameters differently than a second intermediate result of an operation on a second set of the second plurality of speech parameters in a second weighted representation of the second plurality of speech parameters, and wherein the comparator employs the second weighted representation of the second plurality of speech parameters to determine a second vector index.

46. The system of claim 45 wherein the evaluator and the comparator comprise a quantization unit that employs a first distortion measure to determine the first vector index, and wherein the quantization unit employs a second distortion measure different from the first distortion measure to determine the second vector index.

47. The system of claim 45 wherein the quantization unit employs a codebook to quantize the first plurality of speech parameters to determine the first vector index, and wherein the quantization unit employs a codebook to quantize the second plurality of speech parameters to determine the second vector index.

48. The system of claim 47 wherein the quantization unit employs split vector quantization to quantize the first plurality of speech parameters to determine the first vector index and quantize the second plurality of speech parameters to determine the second vector index.

49. The system of claim 45 wherein the quantization unit employs a first codebook to quantize the first plurality of speech parameters to determine the first vector index, and wherein the quantization unit employs a second codebook different from the first codebook to quantize the second plurality of speech parameters to determine the second vector index.

50. The system of claim 26 wherein the evaluator increases an effect of the first intermediate result in the weighted representation of the plurality of speech parameters.

* * * * *